UNITED STATES PATENT OFFICE.

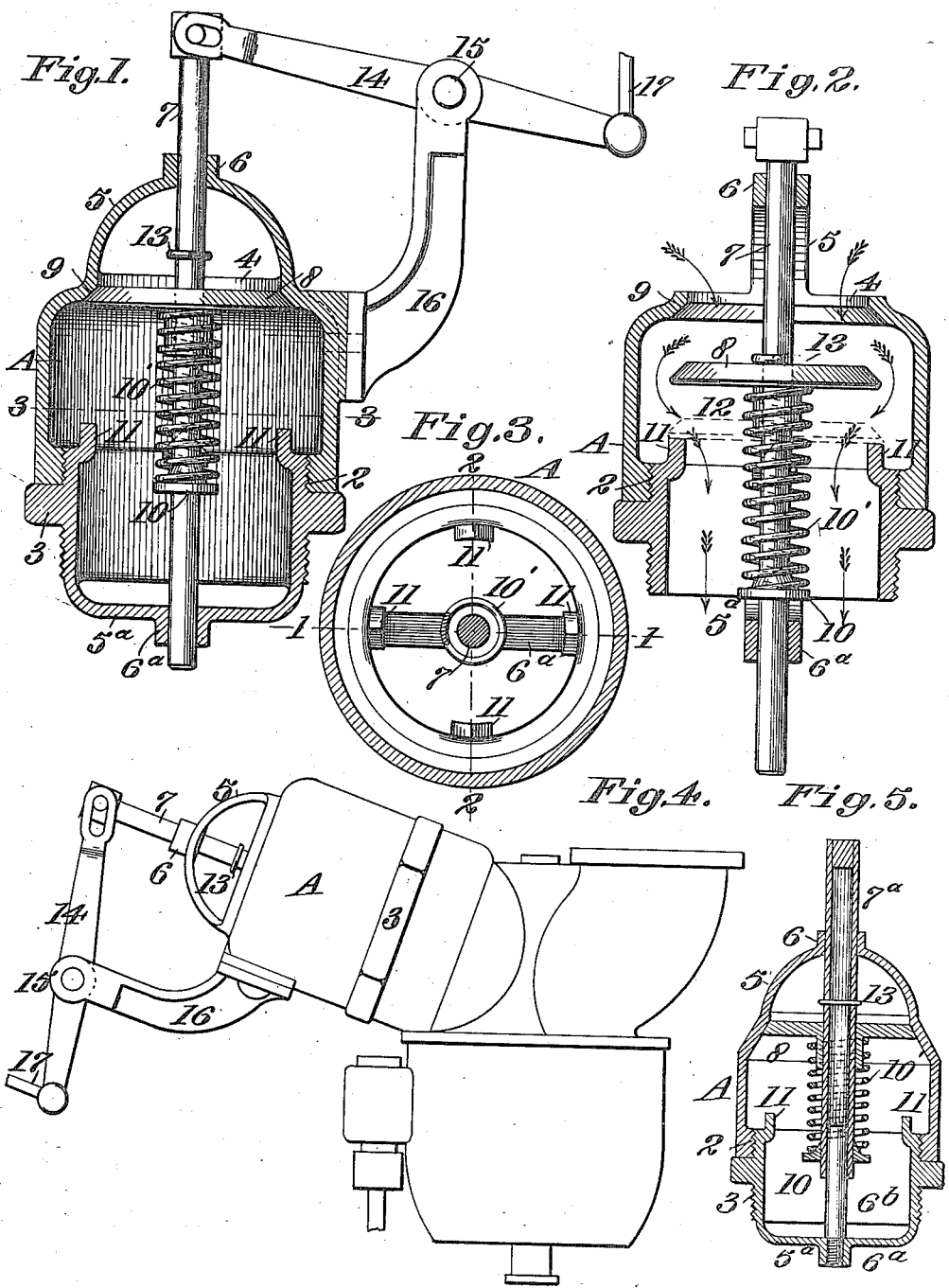

JOHN J. COLL, OF RENO, NEVADA.

VALVE.

1,177,019.  Specification of Letters Patent.  Patented Mar. 28, 1916.

Application filed March 5, 1914. Serial No. 822,597.

*To all whom it may concern:*

Be it known that I, JOHN J. COLL, a citizen of the United States, residing at Reno, in the county of Washoe and State of Nevada, have invented new and useful Improvements in Valves, of which the following is a specification.

This invention relates to improvements in valves.

The objects of my improvements are, first, to provide a simple, substantial, reliable, easily operated valve which is particularly constructed for application as an auxiliary air inlet valve for carbureters; and, second, to so construct the valve that it may be opened either manually or automatically.

The invention consists of the parts and the construction and combination of parts, as hereinafter more fully described and claimed, having reference to the accompanying drawings, in which—

Figure 1 is a vertical central section through the valve on the line 1—1, Fig. 3. Fig. 2 is a similar section on the line 2—2, Fig. 3, showing the valve manually opened. Fig. 3 is a horizontal section on the line 3—3, Fig. 1. Fig. 4 is a side elevation of a carbureter showing the application of the valve. Fig. 5 is a vertical section showing a slight modification of the valve adjusting mechanism.

Referring to the drawings, the valve is shown as comprising a casing A, the lower end of which is threaded, as at 2, to permit its application to an externally threaded bushing 3, through the medium of which it may be inserted into the inlet side of the carbureter, as indicated in Fig. 4. The upper end of the casing is open, as indicated at 4, and extending across said opening is a bowed cross arm 5, in the upper end of which is formed a guide bearing 6. The lower end of the bushing 3 is also open and is similarly provided with a cross arm $5^a$ and a guide bearing $6^a$. Slidably mounted in said bearings and extending through the casing is a stem 7, and slidably mounted upon said stem is a valve 8 which is normally adapted to engage with a seat 9 formed just below the inlet 4 in the upper portion of the casing. Formed on the stem or otherwise secured upon same is a collar 10, between which and the valve 8 is a coil spring 10' is interposed.

The upper end of the bushing has formed on its inner edge a plurality of upwardly extending lugs 11 which are provided for the purpose of limiting the downward movement of valve 8 without entirely closing off the passage of air through the casing; sufficient space being left between the tops of the lugs and the top edge of the bushing to permit a passage of air around the outer edge of the valve. The extreme lower position of the valve, when this is in engagement with the lug members 11, is indicated by dotted lines, as at 12, in Fig. 2.

Suitably secured upon the upper end of the stem is a removable wire clip or collar 13, the purpose and function of which will be later described. The stem 7 may be moved in an upward or downward direction through the guide or bearing members 6 and $6^a$ for the purpose of manually opening the valve, as indicated in Fig. 2, or for the purpose of increasing or decreasing the tension upon the spring 10. This may be accomplished through the medium of a lever, indicated at 14, which is pivotally mounted, as at 15, on a bracket 16 formed or otherwise secured upon the side of the casing or any other suitable support. The outer end of this lever may be connected through a link 17 with a lever placed within convenient reach of the operator.

The operation of the valve will be as follows: When used as an auxiliary air inlet valve for carbureters its application will be such as is shown in Fig. 4. The position of stem 7, shown in Fig. 1, will permit valve 8 to be automatically opened to admit air through the casing when the suction within the carbureter becomes sufficiently great to move the valve. The tension of the spring interposed between the collar and the valve may be increased or decreased by raising or lowering the rod through the medium of lever 14 and link 17. The amount of auxiliary air admitted through the valve may thus be quickly and easily regulated directly from the seat of the car without necessitating the operation of adjusting screws or the removal of parts to gain admission to the valve. The valve may, furthermore, be manually operated, if desired, by moving the rod 7 a sufficient distance down to bring the wire clip 13 into engagement with the top of the valve, as indicated in Fig. 2.

A valve constructed as here shown may be quickly and easily adjusted by the least unskilled person and is not only automatic in operation but may also be manually operated. The valve is simple in construction and positively reliable in action and takes no more space than similar valves heretofore constructed.

The materials and finish of the several parts of the valve are such as the experience and judgment of the manufacturer may dictate.

Fig. 5 shows a slight modification in which a tube 7ª is used. The upper end of the tube is guided in the bearing member 6 while the lower end is guided on a stud member 6ᵇ. The operation and adjustment of valve 8 is the same as previously described.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. In a suction operated valve, a casing, a stem slidable in the casing so as to be capable of actuation by a thrusting movement, a valve on the stem slidable thereon independently of the movement of the stem, a spring operatively engaged at one of its ends with the stem and operatively bearing against the valve at its other end, and means operable at a distance from the valve to enable instantaneous sliding of the stem by thrusting the latter in one or the other direction to effect compression or expansion of the spring, thereby increasing or decreasing the spring tension on the valve so as to enable the spring to be set to enable opening of the valve under varying strengths of suction.

2. In a valve, a casing, a stem sildable in the casing, a valve slidable on the stem, abutments on the stem located on opposite sides of the valve, one of the abutments being normally spaced from the valve and engageable therewith by a long movement of the stem to positively open the valve, a spring encircling the stem and engaged with the other abutment and the valve, and means to slide the stem so as to compress or enable expansion of the spring, said spring upon release of the sliding means acting to instantaneously restore the latter to normal position.

3. In a valve, a casing, a stem slidable in the casing, a valve on the stem slidable independently thereof, a spring rigidly connected at one end to the stem and bearing against the valve at its other end, means to slide the stem so as to adjust the spring tension on the valve by moving the rigidly connected end of the spring close to or away from the valve, and means normally spaced from the valve and borne by the stem whereby upon predetermined sliding movement of the stem the valve will be positively unseated.

4. In a valve, a casing, a stem slidable in the casing, a valve on the stem slidable thereon independently of the movement of the stem, a spring operatively engaged at one of its ends with the stem and operatively bearing against the valve at its other end, means to slide the stem in one or the other direction so as to compress or enable expansion of the spring thereby increasing or decreasing the spring tension on the valve, and means normally spaced from the valve and borne by the stem whereby upon predetermined sliding movement of the stem the valve will be positively unseated.

In testimony whereof I have hereunto set my hand in the presence of two subscribing witnesses.

JOHN J. COLL.

Witnesses:
O. W. COUGHLIN,
FRANK McGOOGAN.